June 10, 1969     T. W. SMOOT ET AL     3,449,084
LINING FOR SECONDARY AMMONIA REFORMER
Filed April 20, 1966
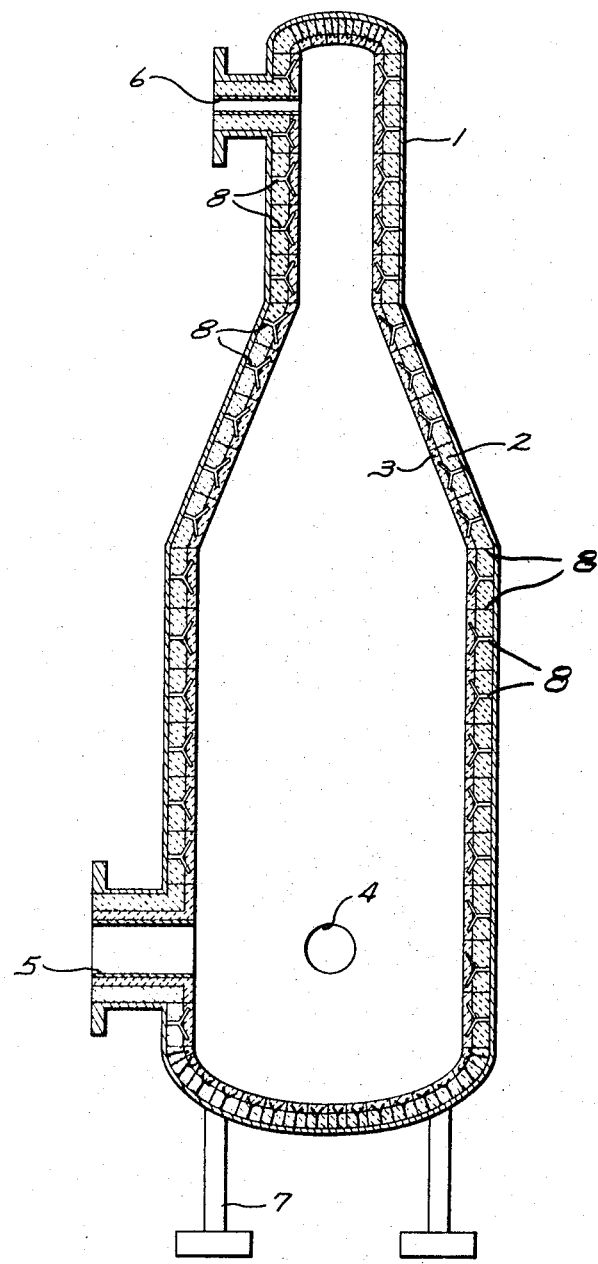
INVENTOR.
THOMAS W. SMOOT,
BY GEORGE D. COBAUGH
William C. [signature]
ATTORNEY

United States Patent Office 3,449,084
Patented June 10, 1969

3,449,084
LINING FOR SECONDARY AMMONIA REFORMER
Thomas William Smoot, Bethel Park, and George D. Cobaugh, Pittsburgh, Pa., assignors to Dresser Industries, Inc., Dallas, Tex., a corporation of Delaware
Filed Apr. 20, 1966, Ser. No. 543,964
Int. Cl. B01j 9/02; B01d 53/00
U.S. Cl. 23—277                                                1 Claim

ABSTRACT OF THE DISCLOSURE

A secondary ammonia reactor having a working lining consisting of high alumina refractory material and a back up lining consisting of fireclay refractory material.

---

This invention relates to vessels used for combining cracked natural gas with air to remove oxygen therefrom as water. More particularly, this invention relates to secondary ammonia reformers.

Most ammonia and ammonia derivatives are currently manufactured by the steam reform process. In this process, natural gas or refinery gas is cracked or broken down over a catalyst such as nickel by combining with steam to yield hydrogen, carbon monoxide, and carbon dioxide. These gases are then passed into a secondary reformer where air is introduced and combustion occurs removing free oxygen by conversion to water with some hydrogen.

Carbon monoxide and carbon dioxide must then be removed. First, the carbon monoxide is "shifted" to carbon dioxide by the addition of steam and passage over a catalyst. Then the carbon dioxide is removed from the gas stream by scrubbing, and transferred elsewhere. The remaining synthesis gas, consisting of hydrogen and nitrogen in the ratio of about 3:1, is compressed and passed over a catalyst where the two elements unite to form ammonia gas.

The secondary reformer chamber contains a catalyst and atmosphere of about 30–60% raw hydrogen. The temperature is generally between 1800–2300° F. In the past, secondary reformers have been lined with fireclay refractory gunning mixes or even fireclay brick. We discovered that the extremely reducing atmosphere and elevated temperatures tended to cause volatilization of the silica in the fireclay brick or gunned linings. This volatilization reaction is endothermic and tends to disturb the heat balance in the reformer process. Also, when the gaseous products of the secondary reformer are passed through a waste-heat boiler, the volatilized silica tends to condense within boiler tubes reducing the overall efficiency of the boiler, and sometimes even plugging the tubes.

It is an object of this invention to provide a secondary ammonia reformer with a lining which is resistant to the atmospheres present therein. It is another object of this invention to provide a lining from a high alumina monolithic refractory material.

According to one aspect of this invention, a secondary ammonia reformer is provided with a high alumina monolithic lining comprising a calcined high alumina aggregate, high alumina cement and, preferably, a small quantity (up to 5%) of plasticizer such as ball clay. Suitable high alumina aggregates are calcined Alabama bauxite (75% $Al_2O_3$), calcined South American bauxite (89% $Al_2O_3$), calcined diaspore (74% $Al_2O_3$), and tabular alumina (99% $Al_2O_3$). In all of these aggregates, the molar ratio of alumina to silica should exceed 3 to 2, so that all of the silica is tied-up as mullite. According to another aspect of this invention, a refractory insulating lining is placed behind the high alumina monolithic lining.

This invention is more clearly understood by a study of the attached drawing, which is a section of a secondary ammonia reactor. The reactor has an outer metal shell 1.

Adjacent the inside of the metal shell is a layer of insulating refractory 2. The working lining 3, according to this invention, is provided by a high alumina refractory monolith. The reformer has an opening 4 for the introduction of the cracked natural gas and another opening 5 for the introduction of air. The reformer has an opening at the top 6 for the removal of the synthesis gas. Not shown in the drawing are the catalyst supports and catalyst carriers. The reformer is held in position by suitable supports 7. In order to facilitate placement of the refractory lining, anchors 8 are placed over the interior of the reformer suitably attached to the metal shell 1.

The term "high alumina refractory monolithic lining" has a well known (although unwritten) meaning in the refractories art. The ASTM classification of refractory castables is not based on chemical analysis (see ASTM Designation C401–60.). High alumina refractory monolith refers to linings comprising from 70–90%, by weight, refractory aggregate containing more than about 70% alumina such that the silica present is tied-up as mullite and from 10–30% calcium aluminate cement. Table I includes the chemical analysis of some suitable high alumina aggregates. Table I also includes the chemical analysis of a suitable calcium aluminate cement used in the practice of this invention.

TABLE I

|  | Calcined Alabama bauxite | Calcined South American bauxite | Calcined diaspore | Calcium aluminate cement | Synthetic alumina |
|---|---|---|---|---|---|
| $SiO_2$ | 21.3 | 6.2 | 18.9 | 0.2 | 0.06 |
| $Al_2O_3$ | 75.0 | 89.0 | 73.3 | 72.2 | 99.75 |
| $TiO_2$ | 2.6 | 3.1 | 4.0 | | 0.008 |
| $Fe_2O_3$ | 1.1 | 1.5 | 1.5 | | 0.08 |
| CaO | 0.1 | | | 27.0 | <0.001 |
| MgO | | | | 0.2 | (1) |
| Alkalies | 0.1 | 0.2 | | 0.4 | 0.07 |

[1] Not detected.

A suitable insulating refractory monolith for the practice of this invention comprises from about 20 to 40% calcium aluminate cement, from 20 to 40% lightweight refractory filler such as perlite or expanded vermiculite, and from 40 to 60% calcined and uncalcined fire clay substantially all minus 65 mesh.

Typical size gradings for high alumina gunning mixes and insulating gunning mixes used in the practice of this invention are given in Table II.

TABLE II

|  | High Alumina gunning mix, percent | Insulating gunning mix, percent |
|---|---|---|
| −4+10 mesh | 20–30 ⎫ | |
| −10+28 mesh | 20–30 ⎬ | 20–40 |
| −28+65 mesh | 5–15 ⎭ | |
| −65 mesh | 35–45 | 60–80 |

Refractory gunning mixes are placed by pneumatically impacting the mix against the desired situs. This can be done with the use of any of the commercially available refractory guns. Generally, the refractory aggregate is placed into the gun dry. However, it may be predampened to improve gunnability and reduce dusting. The major portion of the water required to form the hydraulic bond is added at the nozzle. For more detailed description of refractory gunning procedures, see page 154 of Modern Refractory Practice, 4th edition, which is incorporated herein by reference.

It has been found that by lining the secondary reactor with a high alumina refractory monolith, the heat balance is no longer disturbed. Also, the waste heat boilers are no longer clogged by condensed silica. The combination of a high alumina monolithic lining and secondary reactor provides a new and unexpectedly improved reactor.

Having thus described the invention in detail and with sufficient particularity as to enable those skilled in the art to practice it, what is desired to have protected by Letters Patent is set forth in the following claim.

We claim:

1. In a secondary ammonia reactor having a metal shell with anchors attached thereto, the improvement comprising a working lining consisting of from 70 to 90%, by weight, refractory aggregate containing more than 70% alumina, 10 to 30% calcium aluminate cement, and up to 5% plasticizer, and the backup lining comprising from 20 to 40% calcium aluminate cement, from 20 to 40% lightweight refractory filler, and from 40 to 60% fire clay.

References Cited

UNITED STATES PATENTS

| | | | |
|---|---|---|---|
| 3,226,240 | 12/1965 | Crowley | 106—64 |
| 3,077,058 | 2/1963 | Hensel | 52—378 |
| 2,973,252 | 2/1961 | Shields et al. | 23—288 |
| 2,525,821 | 10/1950 | Molique | 23—288 |

JAMES H. TAYMAN, JR., *Primary Examiner.*

U.S. Cl. X.R.

23—252, 288; 48—196; 52—249, 378; 75—95; 106—64; 196—133; 263—46; 264—30